A. J. WILLS.
MACHINE FOR SETTING UP CARTONS.
APPLICATION FILED MAR. 27, 1914.

1,195,937.

Patented Aug. 22, 1916.
10 SHEETS—SHEET 1.

WITNESSES:
M. E. Flaherty
A. E. O'Brien

INVENTOR:
Arthur J. Wills
By
Brown & Hayes
his attorneys.

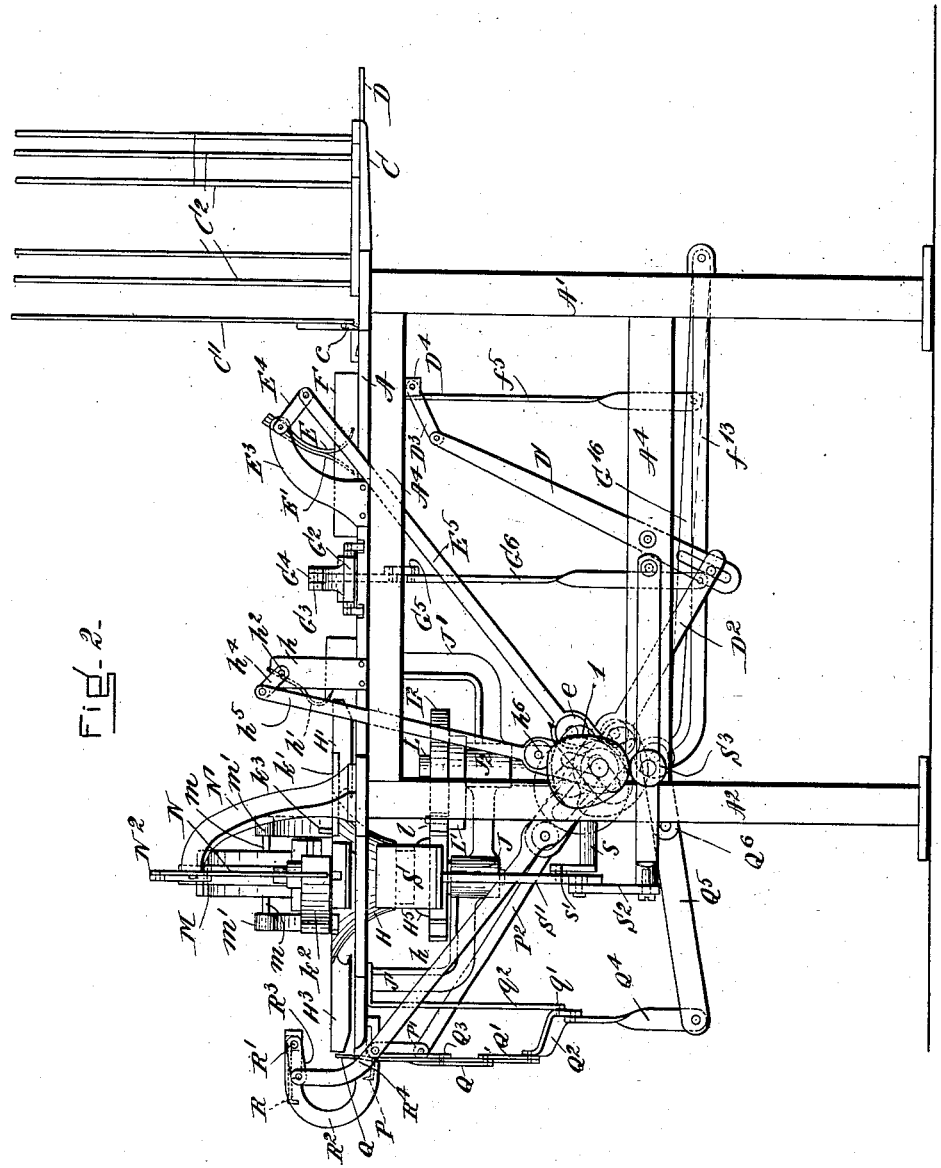

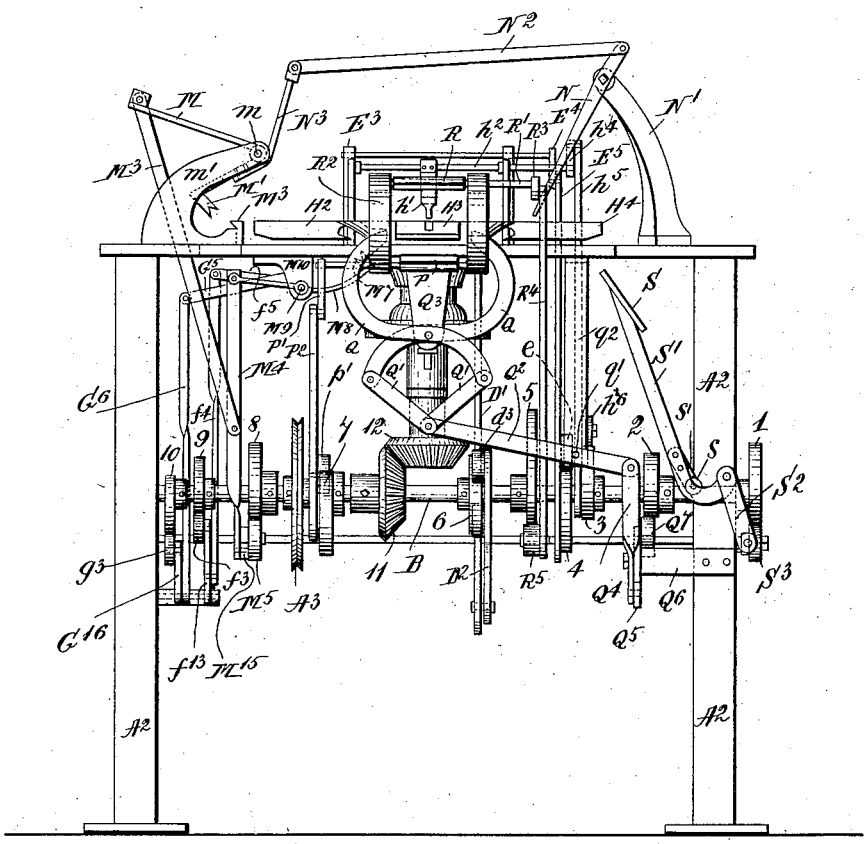

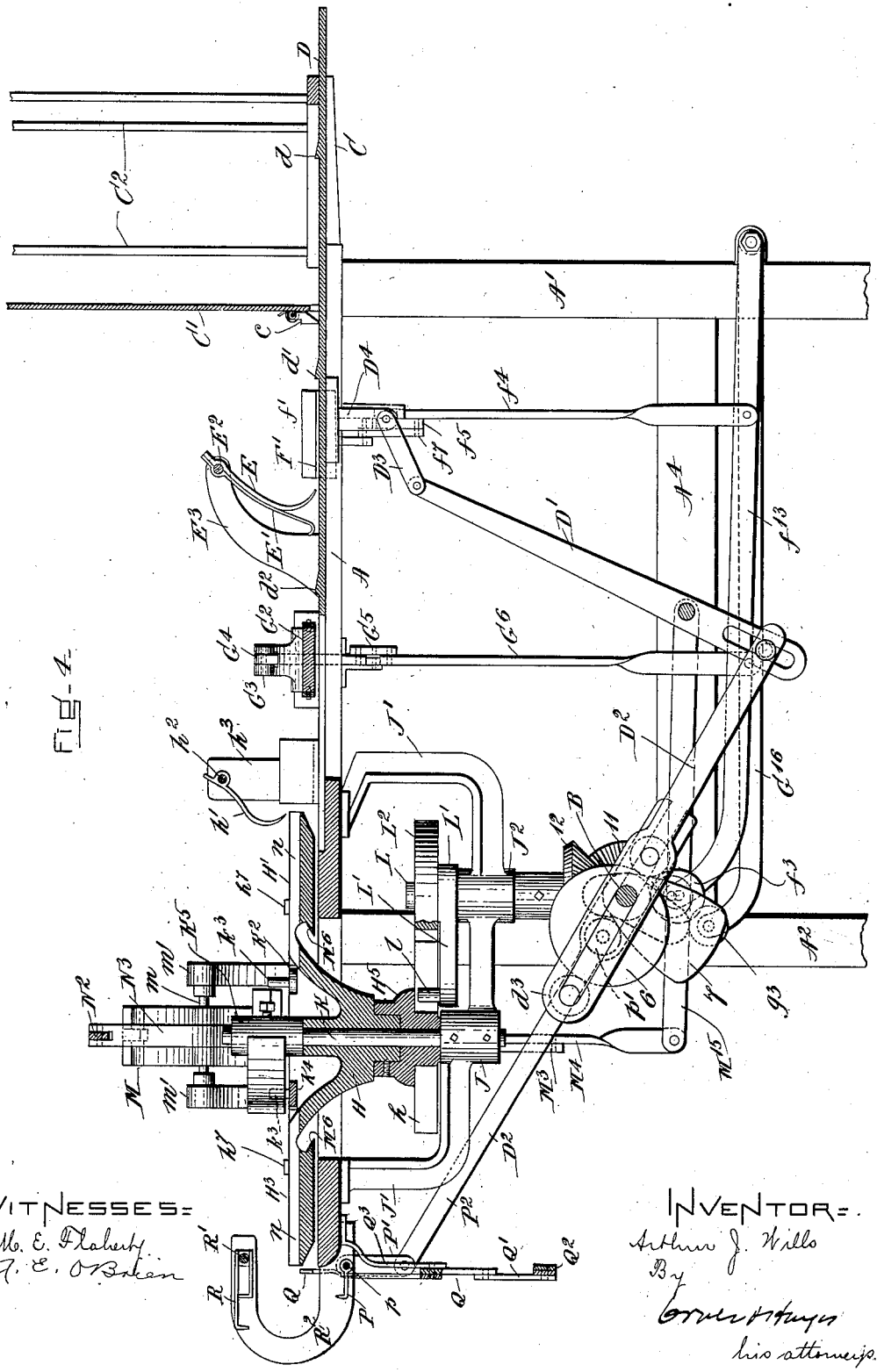

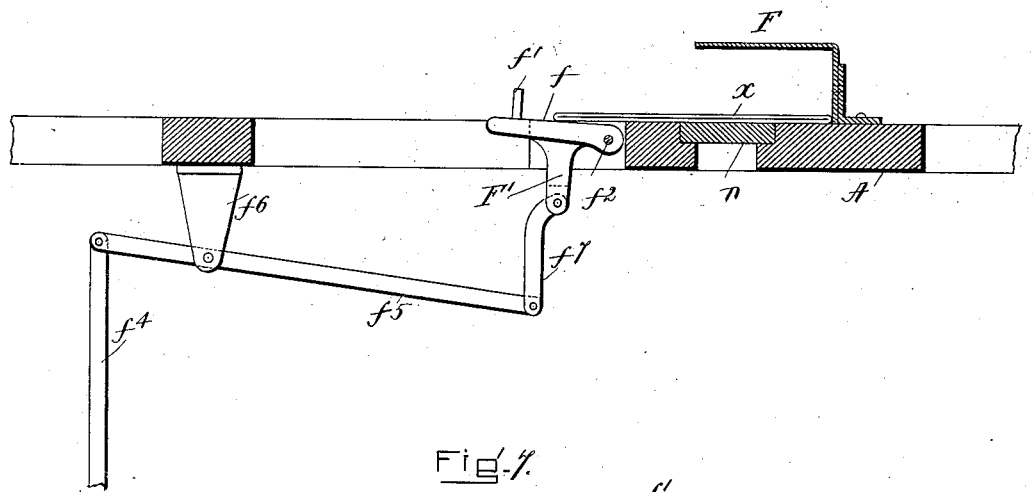
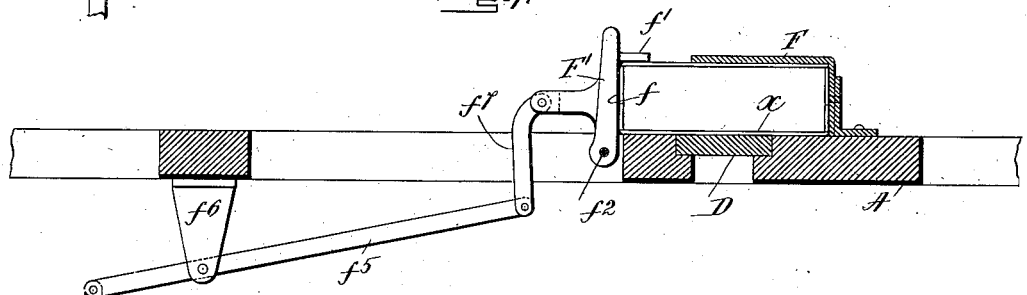
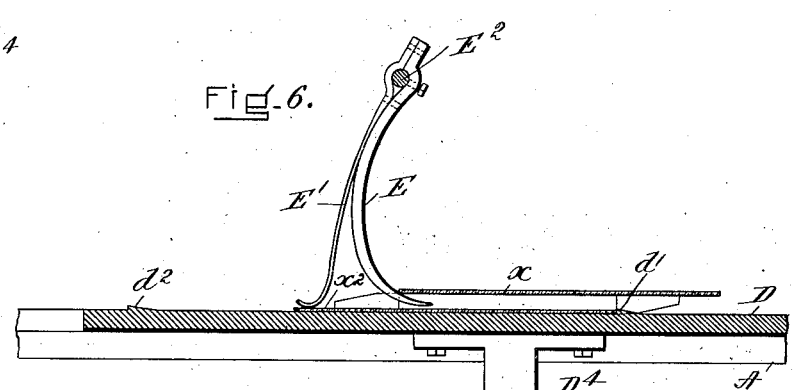

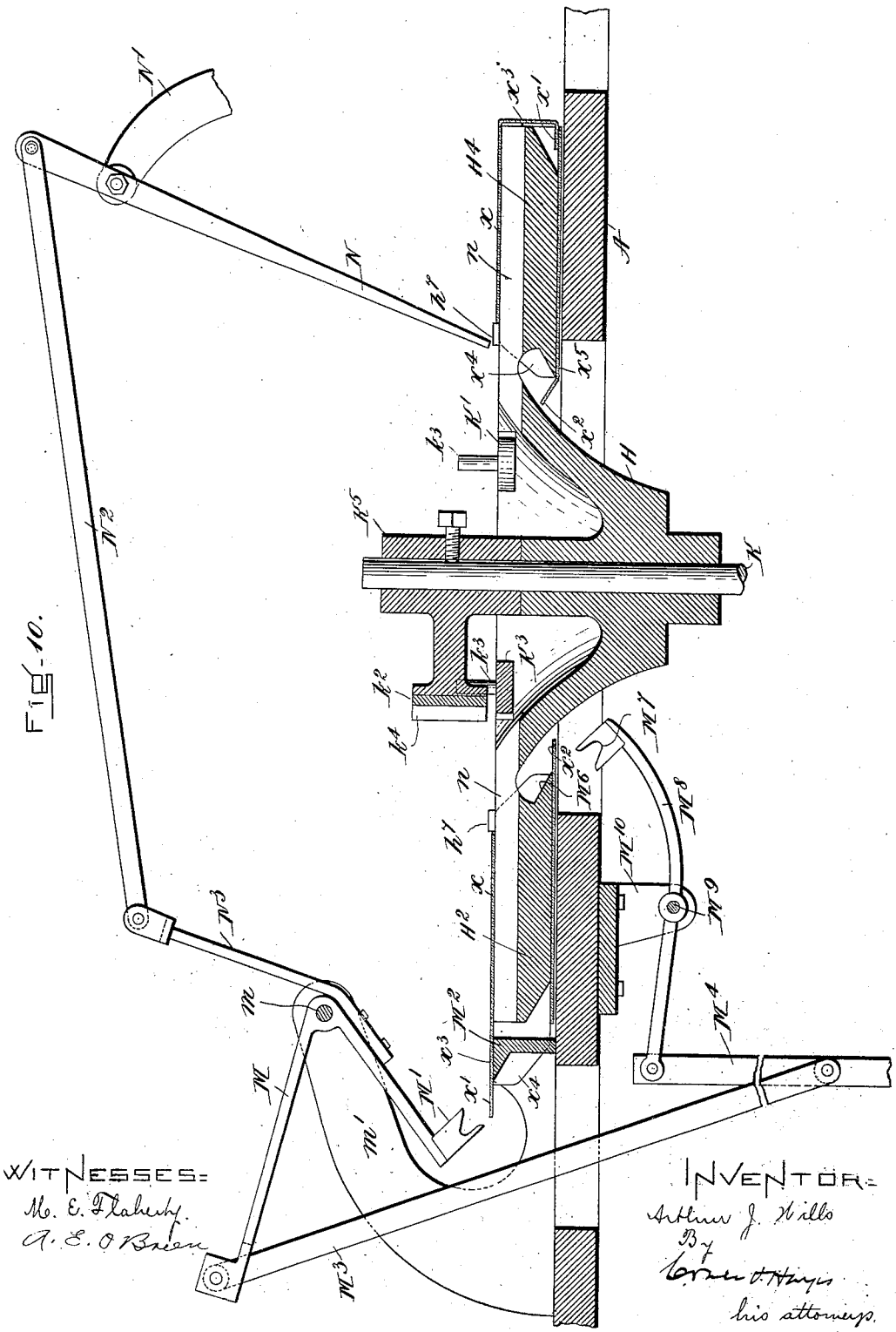

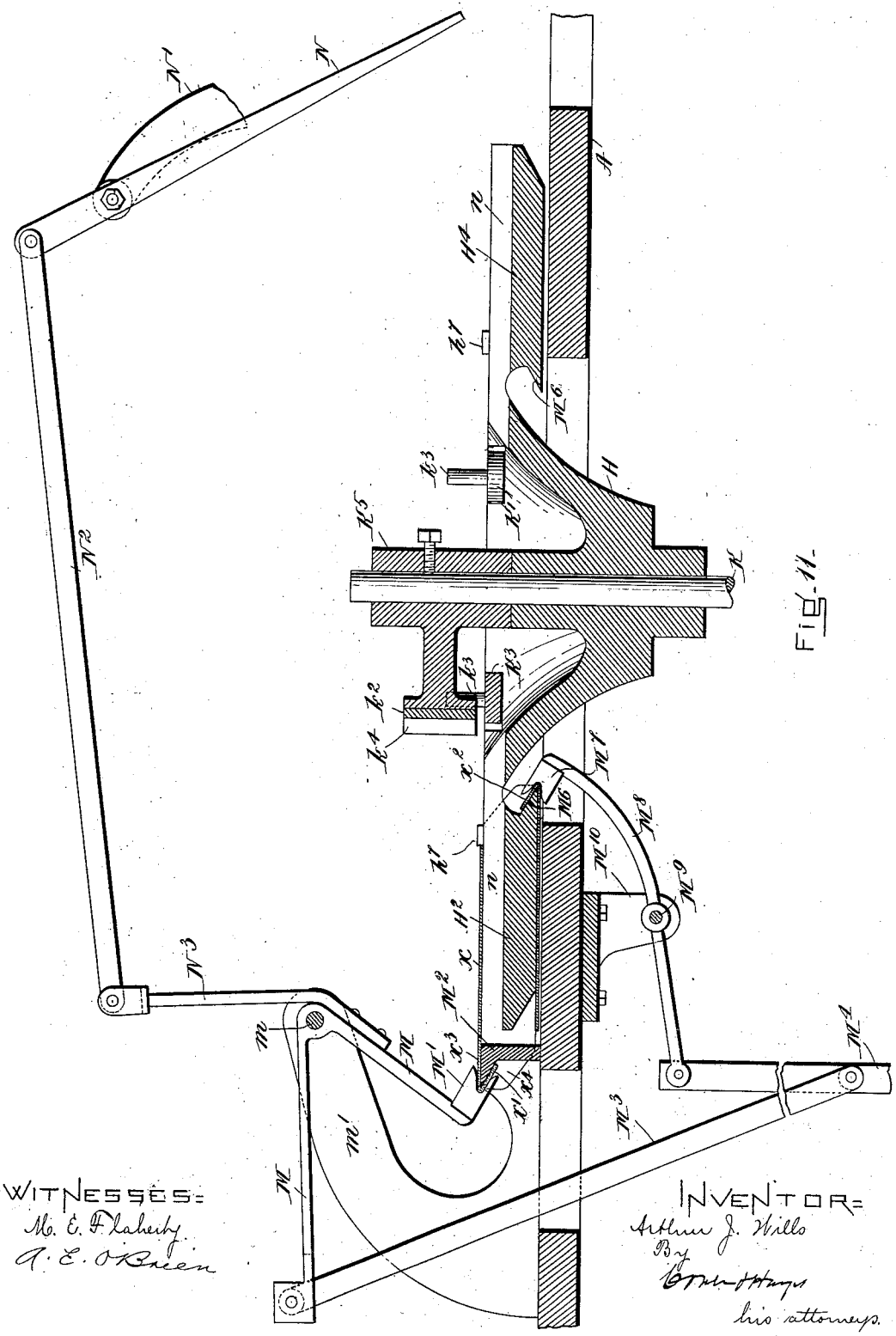

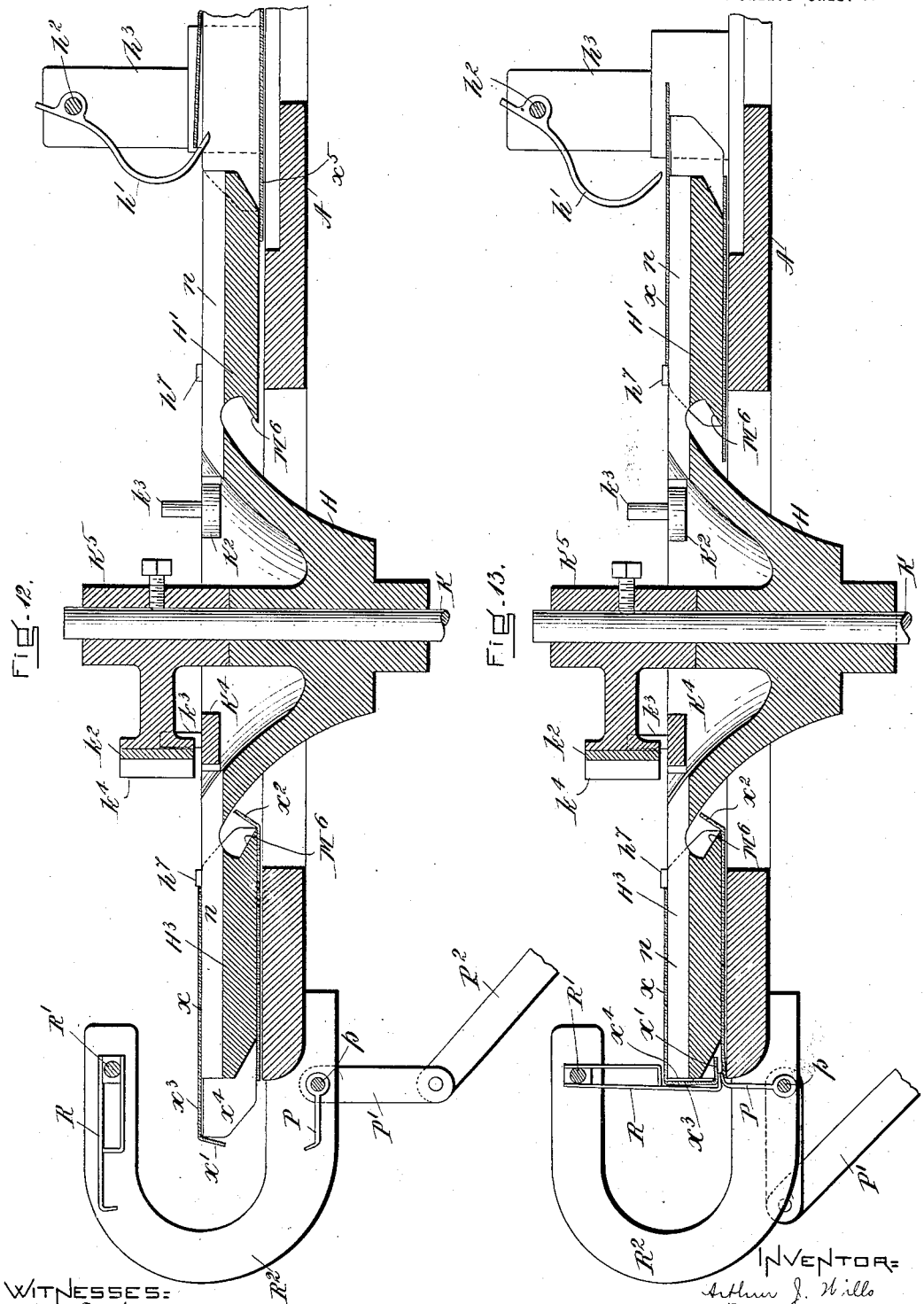

UNITED STATES PATENT OFFICE.

ARTHUR J. WILLS, OF BROOKFIELD, MASSACHUSETTS, ASSIGNOR TO THE B & R RUBBER COMPANY, OF NORTH BROOKFIELD, MASSACHUSETTS, A CORPORATION OF MASSACHUSETTS.

MACHINE FOR SETTING UP CARTONS.

1,195,937.  Specification of Letters Patent.  Patented Aug. 22, 1916.

Application filed March 27, 1914. Serial No. 827,749.

*To all whom it may concern:*

Be it known that I, ARTHUR J. WILLS, of Brookfield, county of Worcester, and State of Massachusetts, have invented a new and useful Improvement in Machines for Setting up Cartons, of which the following is a specification.

Certain cartons when made are delivered flat in large quantities to the purchaser, who is obliged to open the carton from the flat and tuck in the flaps at one end before the carton is in condition to be used. The carton is then filled and the other end is closed and the package is then ready for delivery.

The purpose of my present invention is to take the flat carton as it comes from the factory and open it up, closing in the flaps at one end so that when the carton comes from the machine it is ready to be filled, either by hand or mechanically, as desired.

For this purpose my invention in its preferred form comprises mechanisms for opening the carton blank, creasing it so that it is free to remain in open position, and then crease and fold in flaps which are formed at the bottom of the carton and then discharge the carton. I use the term "crease" because while cartons of this character are creased when folded in closed position they are also scored on certain lines, which scoring determines the lines on which the carton when opened up is to fold, and the carton must be given a bend along those scored lines before the final closing in of the ends is had. These various instrumentalities I have combined in a turret head to which the carton blank is fed, the creasing operation taking place during the feeding of the carton blank from the hopper to the turret. It will be understood, however, that while this construction is best, in my opinion, the various mechanisms may be otherwise combined.

The best embodiment of my invention now known to me will be understood from the drawings, in which—

Figure 1:
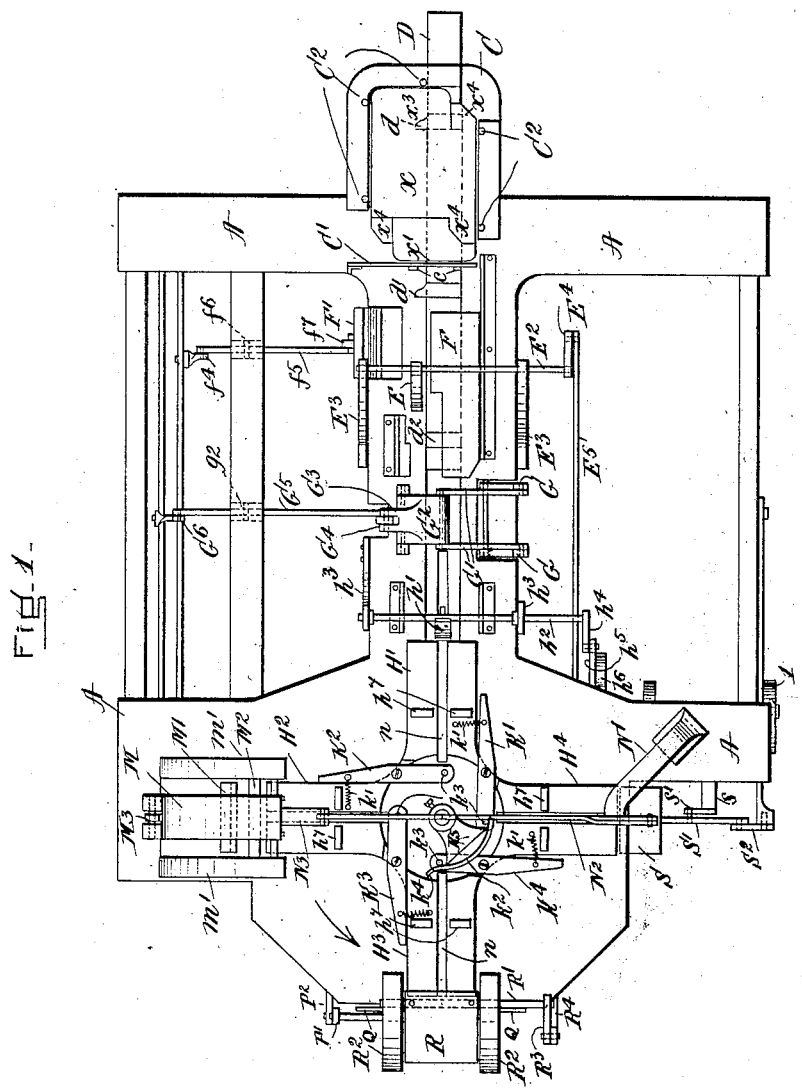
Figure 8:
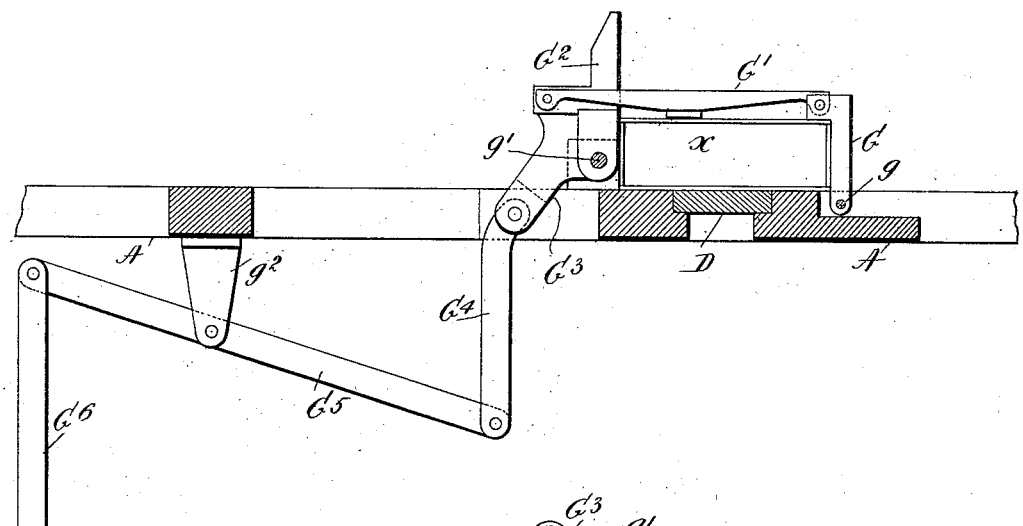
Figure 9:
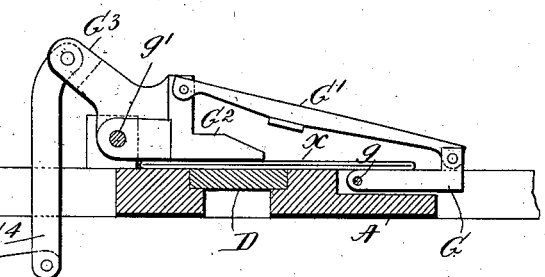
Figure 14:
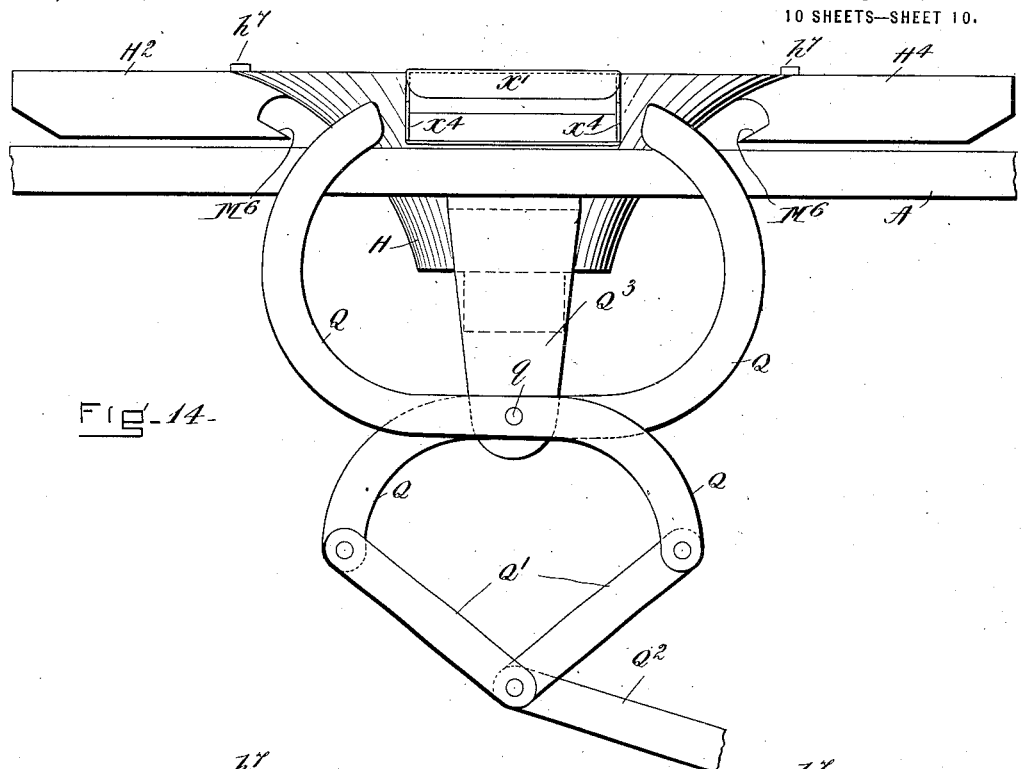
Figure 15:
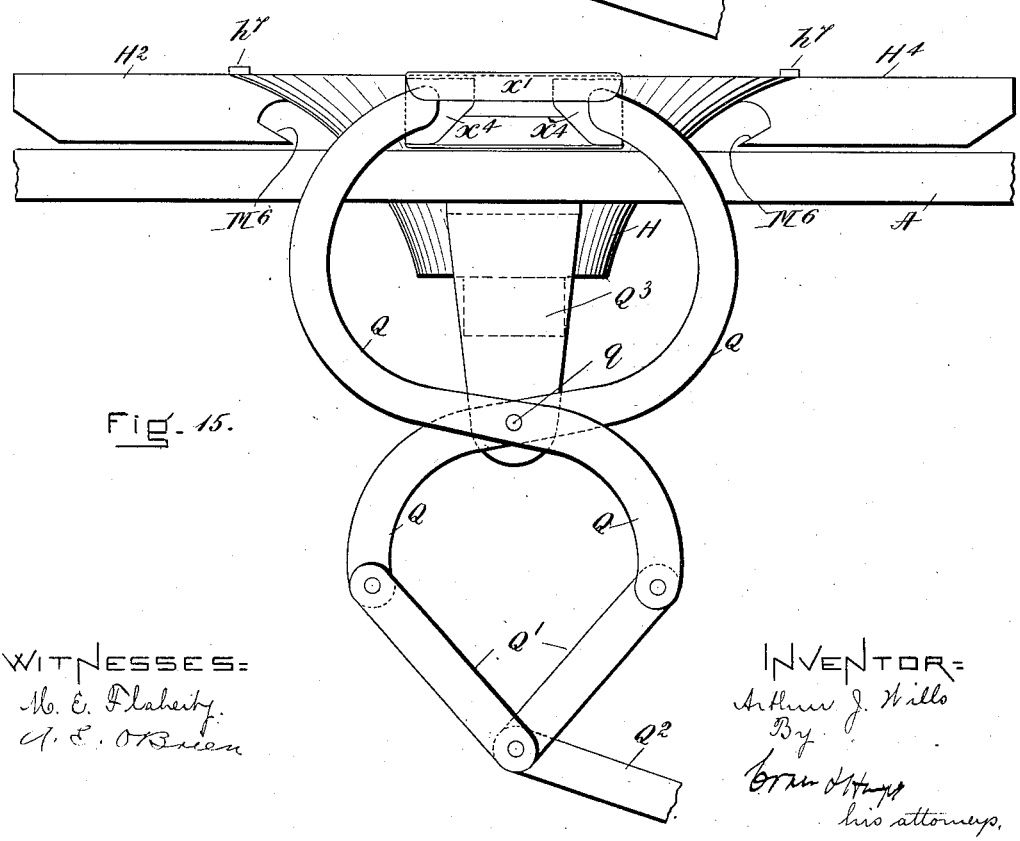

Figure 1 is a plan of a machine embodying the invention. Fig. 2 is a side elevation, Fig. 3 being an end elevation thereof, and Fig. 4 a longitudinal section, these figures together showing the arrangement and location of the various parts. Fig. 5 is an enlarged sectional detail showing the blank fed flat into its first position. Fig. 6 is a sectional detail taken at right angles to Fig. 5, showing means for opening up the blank, Fig. 7 being a view of the parts shown in Fig. 5 in their operating position, the blank here having been squared up and the creasing of the scores having begun. Figs. 8 and 9 are sectional details showing the carton advanced to the second creasing mechanism, Fig. 8 showing its condition when received by the said mechanism and Fig. 9 the action of the said mechansm upon it to give it a crease in the opposite direction from its original crease as shown in Fig. 5. Figs. 10 and 11 show in enlarged sectional detail taken cross-wise of the head the mechanisms for creasing the tabs by which the carton is to be closed, and also showing the mechanism by which the carton is to be finally removed from the machine. Figs. 12 and 13 are similar sectional details taken at right angles to Figs. 10 and 11, showing the manner in which the carton, which has been opened, is fed onto the mandrel, and also the means whereby the bottom of the carton is closed. Figs. 14 and 15 show the mechanism by which the side tabs are folded in.

The machine comprises a table A, supported upon legs A' A² braced by cross braces A⁴, the legs A² supporting between them the main shaft B and carrying a pulley A³ by which power is applied to the said shaft; the shaft also carrying various cams to be hereinafter described.

C is an extension of the table on which the blanks are supported in a hopper comprising a vertical plate C' and a series of uprights C², properly placed to maintain a pile of blanks so that they will register accurately each with the other. The plate C' is supported at one edge from the table A, the main portion of the plate however, for the width of the carton, being raised slightly above the level of the table so as to provide a passage under which a single carton can be fed, and it is provided with spring-engaging fingers $c$ (see Fig. 4) the purpose of which is to prevent more than one carton blank being fed at a time. The blanks are fed from this hopper by means of the slide D, which has three wedge-like pushers $d$ $d'$ $d^2$ located thereon and which is given a limited reciprocating movement, the limit of movement being the length of the body of the blank, so that, for example, the pusher $d$, which is under the pile of blanks in the hopper, pushes the lower blank forward and out until its edge passes under the fingers $c$, and it is in position to be opened and given its first creasing, and then the slide D returns and brings the pusher $d'$ in rear edge of the body of the blank and with the next advance of the slide D the blank is fed from that position to the second creasing mechanism, the series of blanks following each other in this way with sufficient rapidity to keep the other mechanisms constantly occupied. After the second creasing operation the pusher $d^2$ pushes the blank onto the mandrel. Movement is given to the slide D by means of the cam 6 which acts upon the lever D' by means of the cam rod $D^2$, $d^3$ being the cam roll. The lever D' is pivotally mounted upon the cross-brace $A^4$ of the machine and is connected by the link $D^3$ with a hanger $D^4$ attached to the underside of the slide D. This slide D runs in suitable ways in the table A and in the extension C thereon which is the hopper.

The blank is fed forward by the pusher $d$ as above described from under the pile in the hopper to the position to have the first creasing action take place upon it. Up to this moment its condition is as shown in Fig. 5, where X is the blank. It will be noticed that it is absolutely flat, and it is therefore necessary that it be opened up somewhat before any action is taken upon it. For this purpose I have provided an opener E in the form of a curved finger which also carries a spring presser-foot E' located to rest upon the forward tab $x^2$ or extensions of the blank $x$ during its lifting operation so that the blank shall not be disturbed in its registry. This opener E is mounted on a shaft $E^2$ carried in standard $E^3$. Mounted on the table on the end of the shaft $E^2$ is an arm $E^4$ which is connected to a cam-rod $E^5$ which carries a cam roll $e$ which is operated by the cam 4, this cam being shaped to give the opener a slight rocking motion at the proper times. This opening operation having been carried to substantially the extent indicated in Fig. 6, the blank is then squared up. For this purpose there is shown a form F which is stationary and incloses and forms a stop for one of the side edges of the carton as well as the top side, when raised into place as shown in Fig. 7. To force the blank into this form there is shown a lever F' which is also rectangular in shape, comprising a portion $f$ which is to engage a portion of the under side of the flattened blank and on which the blank in its flat shape rests, and the other portion $f'$ at right angles thereto to engage the top side of the blank, when opened, and form a right angle into which the corner of the opened blank will be compressed. This lever F' is pivoted at $f^2$ in a slot in the table and is operated by means of the cam $q$ which acts upon the cam roll $f^3$, cam rod $f^{13}$ pivoted to a bracket on one of the legs A', connecting rod $f^4$ and lever $f^5$ fulcrumed in the hanger $f^6$ and connected to F' by link $f^7$. This cam is so shaped as to rock the lever F' into position shown in Fig. 7 and then withdraw it, during which time the slide D remains stationary.

Upon the release of the blank by the lever F' it is moved along by the pusher $d'$ into position underneath the second creasers by which it is given its fold in the opposite direction, these parts being shown in Figs. 8 and 9. Here the mechanism as shown comprises a hinged frame, the portion G of which receives the corner of the blank, being pivoted at $g$ to the table. The part G is pivotally connected by the connecting rods G' with a folder $G^2$ which is pivoted at $g'$ to the table. This part has an arm $G^3$ which is connected by a connecting rod $G^4$ with a lever $G^5$ fulcrumed on the hanger $g^2$, the outer end of the lever being pivoted to a connecting rod $G^6$ which connects it with the cam rod $G^{16}$ pivoted to a bracket on one of the legs A' and carrying the cam roll $g^3$ running on the cam 10. The action of this cam is to move the creaser $G^2$ and also the mechanism connected therewith from the position shown in Fig. 8 to the position shown in Fig. 9, where it will be seen that the blank X has been crushed flat again but into a reversed position from that shown in Fig. 5. Upon the return of the parts from their position shown in Fig. 9 to their position shown in Fig. 8, the blank will spring up again into its rectangular position and be ready to be moved forward by the pusher $d^2$ to be acted upon by the creasing and tucking mechanisms.

I prefer, for the purpose of tucking in the flaps, that the carton be fed upon a mandrel which shall form one of a series carried by a turret head so that after being fed upon the mandrel the head is given a quarter revolution to a position where the tab creasing operation takes place whereby the tabs or extremities of the projecting extensions of the blank shall be bent down or broken and thereafter the head shall be turned another 90° to a mechanism which shall finish the tucking in of the end and side tabs and then through another 90° to a position under mechanism which shall throw off the carton, which has now been finished so far as this machine is concerned. I have lettered the mandrels $H^1$ $H^2$ $H^3$ $H^4$, but as the mandrels are all alike these letters refer to the several positions of the mandrels and not to any difference between them.

The construction and operation of the turret head will be understood from Figs. 1 and 4. The turret head comprises a hub H having projecting at right angles therefrom four mandrels $H^1$ $H^2$ $H^3$ $H^4$. This hub is supported by a star-gear $H^5$ which is mounted on a boss J which forms part of a bracket J′ hanging from the underside of the table A; this bracket also containing a second boss $J^2$ to support a shaft. In the boss J is mounted a rod K which serves as an axle around which the hub H and gear $H^5$ revolve, this rod being stationary. The star-gear $H^5$ is of such well known construction that it need not be here described except to say that it has 4 slots $h$ located each with such relation to one of the mandrels H′, etc., that by means of it the turret head may be rotated one-quarter of a revolution at a time. For this purpose there is mounted on the shaft B a bevel gear 11 which meshes with a corresponding bevel gear 12 at the lower end of a vertical shaft L running in the boss $J^2$ and carrying at its upper end an arm L′ having at its end a pin $l$ adapted to engage with each rotation one of the slots $h$ in the star-gear $H^5$. A mutilated disk $L^2$, also located on the shaft L, serves to lock the star-gear in place when it is not being engaged by the pin $l$. This mechanism being old and well known is not further described. By this means the turret is rotated step by step so as to bring each mandrel in turn into the position marked $H^1$ in registry with the slide D to receive therefrom the opened blank.

To prevent the edge of the blank from catching upon the edge of the mandrel, I have provided a finger $h'$ similar to the opener E and mounted on a shaft $h^2$ supported by uprights $h^3$ mounted on the table. This shaft $h^2$ is connected by a link $h^4$ with a cam rod $h^5$ which is operated by a cam roll $h^6$ engaging the cam 3, the construction of this cam being such as to throw the hook or finger $h'$ into the blank just as it approaches the mandrel H′ and prevent its upper edge from striking the mandrel. Each mandrel is provided with stops $h^7$ against which the blank is fed.

To hold the blank on the mandrel I have provided clamps K′ $K^2$ $K^3$ $K^4$ which by means of springs $k'$ (see Fig. 1) normally clamp the blank against the mandrel, but during both the receiving of the blank and the discharge of the carton, these clamps are opened by means of a cam surface $k^2$ mounted on a support $K^5$ on top of the rod K. For this purpose each clamp $K^1$ $K^2$ $K^3$ $K^4$ has a pin $k^3$ at its rear end. As the turret head moves each pin in turn strikes this cam $k^2$, the outer ends of which flare outward a little as at $k^4$ so as to serve as a guiding surface as the pin reaches it. Thus, in the rotation of the head of the turret (see Fig. 1) it will be noted that the clamp K′ is open, and that as the turret rotates in the direction of the arrow its pin $k^3$ will slide off from the cam surface $k^2$ and allow the spring $k'$ to close it against the blank which has been put upon the mandrel H′. It will also be noted in Fig. 1 that the clamp $K^4$ is open in order that the carton may be pushed off from the mandrel $H^4$, and that the clamp $K^4$ will maintain this position during the further rotation of the head or turret until the mandrel at $H^4$ has reached the position now occupied by the mandrel at H′, and after receiving a fresh blank has started into the position of $H^2$ in that figure.

When the mandrel carrying the blank has reached the position indicated at $H^2$ in Fig. 1, the next step is to crease the tabs $x'$ $x^2$ of the top and bottom covers $x^3$ $x^5$. To crease the tabs $x'$ a lever M is provided which is mounted on a shaft $m$ carried in supports $m'$. On the free end of the lever M is mounted a creaser M′ which is adapted to coöperate with a standard $M^2$ mounted on the table A. The lever M is moved by means of a connecting rod $M^3$ pivotally connected to a second connecting rod $M^4$, which is connected to a cam lever $M^{15}$ pivoted on the lever $A^4$ and carrying a cam roll $M^5$ running on the cam 8. The opposite tab $x^2$ is creased simultaneously, each mandrel for this purpose being shaped to provide an edge $M^6$ corresponding in shape to the edge on the standard $M^2$ (see Figs. 10 and 11). These two edges may be termed "formers" coöperating as they do with the creasers to form the angle at which the tabs shall lie. A creaser $M^7$ corresponding to the creaser M′ is mounted on the end of a lever $M^8$ fulcrumed at $M^9$ to a hanger $M^{10}$, the other end of this lever $M^8$ being connected to the rod $M^4$. At the same time that this operation is taking place the pusher N is acting upon a finished carton on the opposite mandrel $H^4$ to discharge the carton therefrom. This pusher is a lever fulcrumed on a standard N′ and operated by a connecting rod $N^2$ which is pivotally connected to a support $N^3$ mounted on the lever M so that these mechanisms operate simultaneously. In order that this pusher may surely engage the carton each mandrel is slotted as at $n$ to form a channel in which the end of the pusher N runs. The pusher having discharged its carton is moved back through this channel $n$ into the position shown in Fig. 10 as the creasers move back, thus leaving the head in position for rotation.

The final operation is given to the blank by the mechanism illustrated especially in Figs. 12, 13, 14 and 15. The head having been moved through an angle of 90° to bring the mandrel into position $H^3$, the next operation is to fold in the side tabs $x^4$ and the bottom cover $x^5$ and its tab $x'$. To accomplish this last operation there is provided a finger P which is moved from its position in Fig. 12 into the position shown in Fig. 13, so that it engages the interior wall of the blank and holds it in position while the folding operation takes place. This finger P is mounted on a shaft $p$ which carries an arm P' connected to a cam rod P² operated by a cam roll $p'$ running on the cam 7. This operation having taken place the next step is to close in the side tabs $x^4$. For this purpose I have provided a mechanism shown in Figs. 14 and 15 which comprises a pair of tongs Q which are connected by links Q' with a lever Q², these tongs being pivoted at $q$ to a hanger Q³. This lever Q² is fulcrumed at $q'$ on a hanger $q^2$, the other end of the lever being connected by a link Q⁴ to a lever Q⁵ supported on a bracket Q⁶ and carrying a cam roll Q⁷ which engages the cam 2. The operation of this cam is such as to maintain the tongs normally in the position shown in Fig. 14 where the blank is ready to be closed and at the proper time to move the tongs toward each other as shown in Fig. 15, to turn the tabs $x^4$ into the position there shown, (see also Fig. 13), and then move out of the way. This action having taken place the final fold is given to the parts $x'$ and $x^3$ by means of the folder R which is mounted on a shaft R' carried in standards R² mounted on the table. This folder is swung down to carry with it the tab $x'$ and bottom cover $x^3$ and fold them into the position shown in Fig. 13, and it is moved by means of an arm R³ pivotally connected to a cam rod R⁴ carrying a cam roll R⁵ running on the cam 5, this cam being shaped to oscillate the folder at the proper times after both the finger P and the tongs Q have been operated. This finishes the carton and it is then ready to be filled by a filling machine or by hand. This final folding mechanism having been withdrawn the head is again turned through 90° so that the mandrel is brought into the position shown in Fig. 12, where the discharge mechanism discharges the finished carton from the mandrel as before described.

As the normal discharge of the carton in the form of my machine shown would drop the carton into the mechanism of the machine I have provided a knock-off S, comprising a plate of sufficient size for the purpose mounted on the end of a lever S' pivoted at $s$ to a bracket $s'$, the other end of this lever being connected to a link S² to a cam lever carrying a cam roll S³ running on the cam 1, this cam being so timed that as the carton is discharged by the pusher N it will strike the knock-off S which at the moment will be moved to throw the carton outside of the frame of the machine.

The operation of the machine above described will be understood without further explanation. I have found that carton blanks of usual weight and material after being creased in the manner described will stand up sufficiently squarely to be fed onto a mandrel. I do not mean however to limit myself to the particular creasing mechanisms shown or methods described. Some of these mechanisms may be omitted with some kinds of blanks and in some cases the blanks may require further treatment. Moreover, many changes of detail may be made without departing from my invention, which, so far is I now know, comprises a machine in which for the first time flat carton blanks are opened up and one of the ends closed automatically, so that the carton is delivered from the machine in condition for immediate use. For example, the two creasing operations may be performed by an instrumentality like that shown in Figs. 8 and 9, though I prefer to use a previous instrumentality for the purpose of giving a preliminary crease to the blank in most cases as with most materials it insures a better feed to the mandrel and a better carton.

What I claim as my invention is:—

1. In a machine of the kind described, a reciprocating bottom-supporting plate, a stationary angular form, and means coöperating with said plate to press a blank into said form whereby the sides of said blank will be brought to right angles with each other.

2. In a machine of the kind described, a hopper, a reciprocatory feeding mechanism, a stationary angular form located at the side of said reciprocating feeding mechanism, and means coöperating with said feeding mechanism to press a blank into said form whereby said blank will be opened up into rectangular position, said feeding mechanism forming a supporting bottom for said blank and said form.

3. In a machine of the kind described, an angular form, means to open a flattened carton blank and push it in one direction into said form whereby it will become rectangular in cross section, and mechanism operable thereafter to force it in the same direction whereby it will again be flattened.

4. In a machine of the kind described, means for opening a flattened carton blank into rectangular position, and means operable thereafter to flatten said blank and then release it whereby the side walls of said blank will be turned in two operations through an angle of substantially 180° and then allowed to spring again into rectangular position, and means for closing one end of said blank to form an open carton.

5. In a machine of the kind described, means to set up a carton from a flattened blank comprising means to slip into one end of the flattened blank and lift it somewhat, means adapted to hold the lower portion of said blank during the lifting action, means operable thereafter to engage the opposite edges of the blank and press them toward each other to bring the blank into squared position, and means to close in one of the ends of the blank.

6. In a carton setting-up machine, means for feeding a flattened blank, and means for opening up said flattened blank comprising a finger adapted to enter said blank and engage and lift one edge thereof, and means for holding down the opposing edge of said blank during said opening-up operation.

7. In a machine of the kind described, means for opening up a flattened blank comprising a rocking finger adapted to enter said blank and lift one edge thereof, and means operable with said rocking finger to hold the opposing edge of said blank.

8. In a machine of the kind described, an angular form, a slide adapted to form a bottom for said form, means for lifting up the edge of an advancing blank, and means operable after said blank is lifted up and coöperating with said slide and said lifting means whereby said blank will be pressed into said form to be squared up into rectangular position.

9. In a machine of the kind described, a hopper, a feeding mechanism, and a creasing mechanism comprising a form, means for lifting up the edge of an advancing blank, and means coöperating with said lifting means and said feeding mechanism to press a blank into said form whereby it will be squared up, said feeding mechanism forming a bottom support for said blank and said form.

10. In a machine of the kind described, a feeding mechanism comprising a slidable plate to provide a support for a blank having pushing means thereon and a rocking finger to open up said blank, and a folding mechanism comprising a stationary angular form, said slidable plate serving as the bottom thereof, and means coöperating therewith to press a blank into said form whereby it will be opened up substantially as described.

11. In a machine of the kind described, a feeding mechanism comprising a slidable plate to provide a support for a blank having pushing means thereon and a rocking finger to open said blank, and a two-fold creasing mechanism, the second part of which creases in the opposite direction from the first part and each comprising a form having said slidable plate as a bottom, and means whereby said blank is pressed into said form and squared up substantially as described.

12. In a machine of the kind described, a feeding mechanism, a creasing mechanism, a mandrel to receive a blank from said feeding mechanism after it has been creased, and means for guiding a blank upon said mandrel, said means comprising a rocking finger adapted to engage and hold up the advancing edge of said blank to prevent its striking the edge of the mandrel.

13. In a machine of the kind described, a creasing mechanism, a mandrel, means for supporting said mandrel, means for feeding a blank from said creasing mechanism to said mandrel, a rocking finger to lift up the edge of an advancing blank and guide it upon said mandrel to register properly therewith, clamping means mounted on said support for said mandrel adapted to be rocked on an axis substantially parallel with the sides of said mandrel, and normally to engage the outer surface of said blank to hold it from endwise displacement, means for holding said clamping means open during the receiving and ejecting of the blank from said mandrel, and means coöperating with said mandrel to close in one end of said blank to form a carton.

14. In a machine of the kind described, a feeding mechanism, an opening-up mechanism, a creasing mechanism, a mandrel, means for guiding said blank onto said mandrel, means for creasing a portion of the end covers of the blank while on said mandrel, whereby such portion may be tucked in to close the ends of the carton, means for closing in one end of said blank, and means for discharging the blank from said mandrel.

15. In a machine of the kind described, means for opening up and creasing the blank along a set of score lines comprising an opening-up mechanism, means for lifting one edge of said blank, means for turning the side walls of said blank through an angle of 180° into flattened position and then releasing the blank.

16. In a machine of the kind described, means for opening up and creasing the blank along a set of score lines, comprising an opening-up mechanism, means for turning the side walls of the blank through an angle of 180° into flattened position, means for pressing the blank when so flattened and for releasing the blank whereby the blank may spring back to rectangular position.

17. In a machine of the kind described, means for opening up a flattened blank, means for turning one edge of said blank through an angle of substantially 90 degrees, whereby said blank will be folded along a score line and brought into rectangular open position, means for feeding said blank to a second creasing means, and said second creasing means, whereby said blank will be folded farther into its flattened position and then released.

18. In a machine of the kind described, means for opening up a flattened blank, means for turning one edge of said blank through an angle of substantially 90°, a form located to receive said blank from said turning mechanism whereby said blank will be set up in rectangular open position, means for feeding said blank to a second folding means, and said second folding means, whereby said blank will be folded farther into its flattened position and then released.

19. In a machine of the kind described, means for opening up a flattened blank, means whereby the body of the blank is brought into rectangular position, said means comprising a stop, means operable thereafter whereby the movement of the body is continued to bring it again into a flattened position, and is then released and allowed to resume its rectangular position.

20. In a machine of the kind described, means for creasing tabs on the ends of said blank comprising a mandrel adapted to support said blank during said creasing operation, formers around which said tabs are to be creased, and folders adapted to engage and press said tabs against said formers.

21. In a machine of the kind described, a rotary head carrying a plurality of mandrels, means for rotating said head step by step, means for feeding to each mandrel in turn an opened carton blank, and means coöperating with each mandrel in turn for creasing the tabs at each end of the blank, means for tucking in the tab carried by the cover at one end of the blank, and means for ejecting the blank from the mandrel.

22. In a machine of the kind described, a mandrel adapted to receive a carton blank, a former, a tab folder adapted to coöperate with said former, means for moving said mandrel with relation to said former, whereby a tab will be brought into proper relation thereto, and means for operating said folder when said tab and said former are in registry, whereby said folder will crease said tab about said former.

23. In a machine of the kind described, a mandrel adapted to receive a carton blank, a former, a tab folder adapted to coöperate with said mandrel, means for moving said mandrel with relation to said former whereby a tab will be brought into proper relation thereto, and means for operating said folder when said tab and said former are in registry, whereby said folder will crease said tab about said former, a second former located at the farther end of said mandrel, and a second folder operated simultaneously with said first-named folder and adapted to fold a tab located at the farther end of said blank about said second former.

24. In a machine of the kind described, a rotary head, a plurality of mandrels mounted thereon, clamping means carried by said head adapted to move in an axis substantially parallel with the rotating axis of the mandrel whereby a blank will be held on the mandrel against lateral movement during the closing process, means for opening said clamping means to receive a blank and at the proper time to release it for discharge, and means operable while said blank is being held on said mandrel to fold in the tabs to close one end of said blank.

25. In a machine of the kind described, a rotary head, a plurality of mandrels arranged radially upon said head and adapted to rotate therewith, clamping means carried by said head comprising an arm movable in relation to said mandrel whereby a blank will be held against lateral movement during the closing process, means for opening said clamping means to receive a blank and at the proper time to release it for discharge, and means operable while said blank is held on said mandrel to fold in the tabs to close one end of said blank.

26. In a machine of the kind described, a mandrel adapted to receive and support a carton blank having tabs, means for folding in the side tabs and the bottom, cover and tab thereof, and means for holding the edge of said carton blank open during said folding-in operation.

27. In a machine of the kind described, means for closing in one end of the carton blank having tabs comprising a mandrel, means for feeding the blank to said mandrel, means for holding open one end of said blank while on said mandrel, means for folding over the side tabs to cover the adjacent end of the blank, and means for folding over the cover thereof and tucking into the blank the tab of said cover.

28. In a machine of the kind described, a head carrying a plurality of mandrels, means for feeding thereto carton blanks having end covers carrying tabs, means for increasing end tabs on said covers, means for folding in the side tabs and closing in the bottom cover and tab of said blank to form a carton, and means for ejecting cartons from said mandrels, as set forth.

29. In a machine of the kind described, a plurality of mandrels each adapted to receive a carton blank, means for supporting said mandrels radially about a common center and for rotating said supporting means intermittently, means for creasing tabs on said blanks operable relatively with means for completely closing one end of said blank, and means for ejecting the finished carton from its mandrel.

30. In a machine of the kind described, an intermittently-rotating head comprising a plurality of mandrels radially supported thereon, each mandrel being adapted to support a carton blank, means for creasing tabs on said blanks, means for closing one end of said blank, and means for ejecting the finished carton from its mandrel, said tab-creasing mechanism and said ejecting mechanism being connected to operate simultaneously the opposite mandrels.

31. In a machine of the kind described, in combination, a mandrel adapted to receive a carton blank, means for closing in one end of said blank to form a finished carton, means for discharging the carton from said mandrel, and means for receiving a carton when discharged, said means comprising a lever having a carton-receiving surface, and means whereby said lever is oscillated to throw such carton out from under the machine.

32. In a machine of the kind described, a series of mandrels, horizontally-rotatable means for supporting them, means for feeding carton blanks thereto, and means for ejecting finished cartons therefrom, both operable in a horizontal plane, and means for creasing the tabs of one carton blank connected to and operable with said ejecting means, while it is ejecting a finished carton.

33. In a machine of the kind described, means for closing one end of a carton blank comprising a mandrel to hold the blank and tongs adapted to engage the side tabs thereof and approach each other whereby said tabs will be folded to a position at right angles to the length of the blank, and means for folding and tucking in the cover of said blank to close its end.

34. In a machine of the kind described, means for closing in the end of a carton comprising a mandrel to hold the carton blank, a guiding finger adapted to be moved into the carton blank and hold one edge of it, means for closing in the side tabs comprising tongs, and means for folding the bottom cover and tucking in its tab.

ARTHUR J. WILLS.

Witnesses:
  GEORGE O. G. COALE,
  M. E. FLAHERTY.